United States Patent [19]

Janik

[11] Patent Number: 5,035,797
[45] Date of Patent: Jul. 30, 1991

[54] KEY SYSTEM FOR FILTER ASSEMBLY

[75] Inventor: Leon P. Janik, Suffield, Conn.

[73] Assignee: Stanadyne Automotive Corp., Windsor, Conn.

[21] Appl. No.: 480,032

[22] Filed: Feb. 14, 1990

[51] Int. Cl.⁵ .............................................. B01D 27/08
[52] U.S. Cl. .................................... 210/232; 210/444; 210/450; 210/493.2
[58] Field of Search ............... 210/232, 238, 282, 444, 210/450–455, 493.2, 541, 542, DIG. 17

[56] References Cited

U.S. PATENT DOCUMENTS 4,654,142 3/1987 Thomsen et al. .................... 210/232
4,764,275 8/1988 Robichaud ........................... 210/450

Primary Examiner—W. Gary Jones
Assistant Examiner—Matthew O. Savage
Attorney, Agent, or Firm—Chilton, Alix & Van Kirk

[57] ABSTRACT

A fuel filter assembly incorporates a key system to ensure compatibility of a replacement filter cartridge for a given base. Keys are formed on the base. Corresponding slots are formed in the endcap of the cartridge to define a compatible cartridge and base. The keys interlock in the slots to mount the cartridge at a fixed angle position of the base.

21 Claims, 3 Drawing Sheets

KEY SYSTEM FOR FILTER ASSEMBLY

BACKGROUND OF THE INVENTION

This invention relates generally to fuel filters employed in connection with internal combustion engines. More particularly, the present invention relates fuel filters having a replaceable cartridge for removing foreign particles and/or separating water from fuel of the fuel supply system of an internal combustion engine.

It has long been recognized that trouble free operation of an internal combustion engine requires some form of filtering of the fuel consumed by the engine. In particular, the absence of high standards of quality control in diesel fuel supplies dictates that an effective fuel filter be incorporated into the fuel supply system for a diesel engine. It is not uncommon for diesel fuel to have significant quantities of abrasive particles and water. The abrasive particles present the potential for permanent damage to components of the fuel injection pump. The abrasive particles can also adversely effect the performance of the pump by destroying the ability of the fuel injection pump to precisely meter and deliver fuel at high pressures. The presence of water in the diesel fuel supply can cause rusting of engine components, and during freezing conditions, can result in interruption of the fuel injection system and/or seizure of moving components.

Diesel fuel also contains a waxy constituent which precipitates as wax crystals when the fuel temperature drops below a characteristic "cloud point". In cold weather conditions, the precipitating wax crystals can rapidly plug a fuel filter and thereby cut off fuel delivery to the internal combustion engine.

A number of conventional fuel filters perform the dual function of removing particulate material from the diesel fuel and separating water from the fuel. In addition, conventional fuel filter units or fuel conditioners frequently employ heaters to prevent wax crystal formation. Conventionally, the fuel filters employ a disposable filter cartridge which is replaced at pre-established intervals of filter usage.

In practice the filter cartridge requirements may vary depending upon such characteristics as the type and make of the internal combustion engine, the specific applications for which the engine is employed, the climate in which the combustion engine is operated and/or regional characteristics as to the quality of the fuel supply. The filter cartridges thus commonly vary as to axial dimensions, capacity and filter media qualities.

One of the problems which is frequently encountered in connection with replacement of the filter cartridge is insuring that the replaced cartridge is compatible with the filtering requirements for the fuel system. Because numerous types and qualities of filter cartridges may dimensionally conform to the base of a given filter assembly, the replacement filter cartridge frequently does not comply with the specifications for the filter assembly, thereby jeopardizing the integrity of the fuel filtering system. The replacement with an incompatible filter cartridge can have very serious effects on the operation of the internal combustion engine and may also be unnecessarily expensive when a less costly cartridge is fully suitable. Frequently, either the owner or the maintenance personnel servicing the internal combustion engine are totally unaware of the replacement filter cartridge specifications and requirements and unknowingly jeopardize the integrity of the filtering system. There are also instances where inferior or improper replacement filter cartridges are intentionally installed without the knowledge of the owner or operator of the vehicle.

U.S. Pat. application Ser. No. 372,645 filed on June 28, 1989 and U.S. Pat. application Ser. No. 404,849 filed on Sep. 8, 1989, both of which applications are assigned to the assignee of the present invention, discloses a fuel filter assembly which employs a base mounting a disposable filter cartridge. The cartridge includes a dual stage filter system wherein fuel flows generally axially to a primary filter element for removing particulate matter and for coalescing water droplets and generally axially to a second filter stage which functions as a water barrier. The cartridge includes an endcap which is secured to the cartridge housing by a rolled seam. The endcap contains an annulus defining a plurality of slots adjacent the rolled seam structure for allowing fuel communication between the cartridge and the filter base. The base forms a sealing ring which engages the lip and the endcap of the cartridge to seal the cartridge with the base.

SUMMARY OF THE INVENTION

Briefly stated, the invention in a preferred form is a fuel system incorporating a key system for keying the replaceable filter cartridge to the base. The filter system is of a type having a base an inlet and an outlet and a replaceable cartridge mountable to the base. The cartridge may include a generally cylindrical housing for a filter which filters fuel passing through the cartridge. At least one key projects from either the base or the cartridge. A corresponding slot in the other base or cartridge is dimensioned and located for receiving the corresponding key for locking the cartridge at a fixed angular position of the base. The base may comprise a sealing lip disposed about a central axis.

The keys are generally equidistantly spaced from the central axis and are located adjacent the sealing lip. The slots are defined in the endcap of the cartridge. The endcap may have a folded configuration comprising an annular sealing surface and a coaxial recessed surface which defines a plurality of angularly spaced apertures. At least one slot is defined in the recessed surface between a pair of the apertures. One of the keys has a transverse section which is greater in area than that of the other keys.

In a preferred embodiment, the keys project axially from the base. The keys interlock in slots of the cartridge at locations which are closely adjacent to the sealing surface of the cartridge and the sealing lip of the base.

The key system ensures replacement cartridge compatibility for various types of filter assemblies having common sealing and mounting configurations wherein each assembly comprises a base and a generally cylindrical filter cartridge which is removably axially mountable to the base. A unique matrix of axially projecting keys is formed on each base of a given type. A unique matrix of slots corresponding to the keys is formed in each cartridge, so that for a given compatible cartridge and base, the keys are interlockable in the slots to lock the cartridge in a fixed angular position of the base and permit the cartridge to be securely mounted and sealed to the base. For each non-compatible cartridge and base, the base keys are not mateable with the cartridge slots and interfere with mounting and sealing the non-compatible cartridge to the base. A unique key matrix may be formed for each desired cartridge capacity. A unique key matrix may also be formed for each desired filter media configuration.

An object of the invention is to provide a new and improved filter assembly incorporating a system to key the replaceable filter cartridge to the base.

Another object of the invention is to provide a new and improved filter assembly key system for efficiently controlling the replacement of the filter cartridge with a compatible replacement cartridge.

A further object of the invention is to provide a new and improved filter assembly key system wherein the cartridge is mounted to the base in a pre-established fixed angular orientation.

Other objects and advantages of the invention will become apparent from the drawings and the specification.

DESCRIPTION OF THE PREFERRED EMBODIMENT

Figure 1:
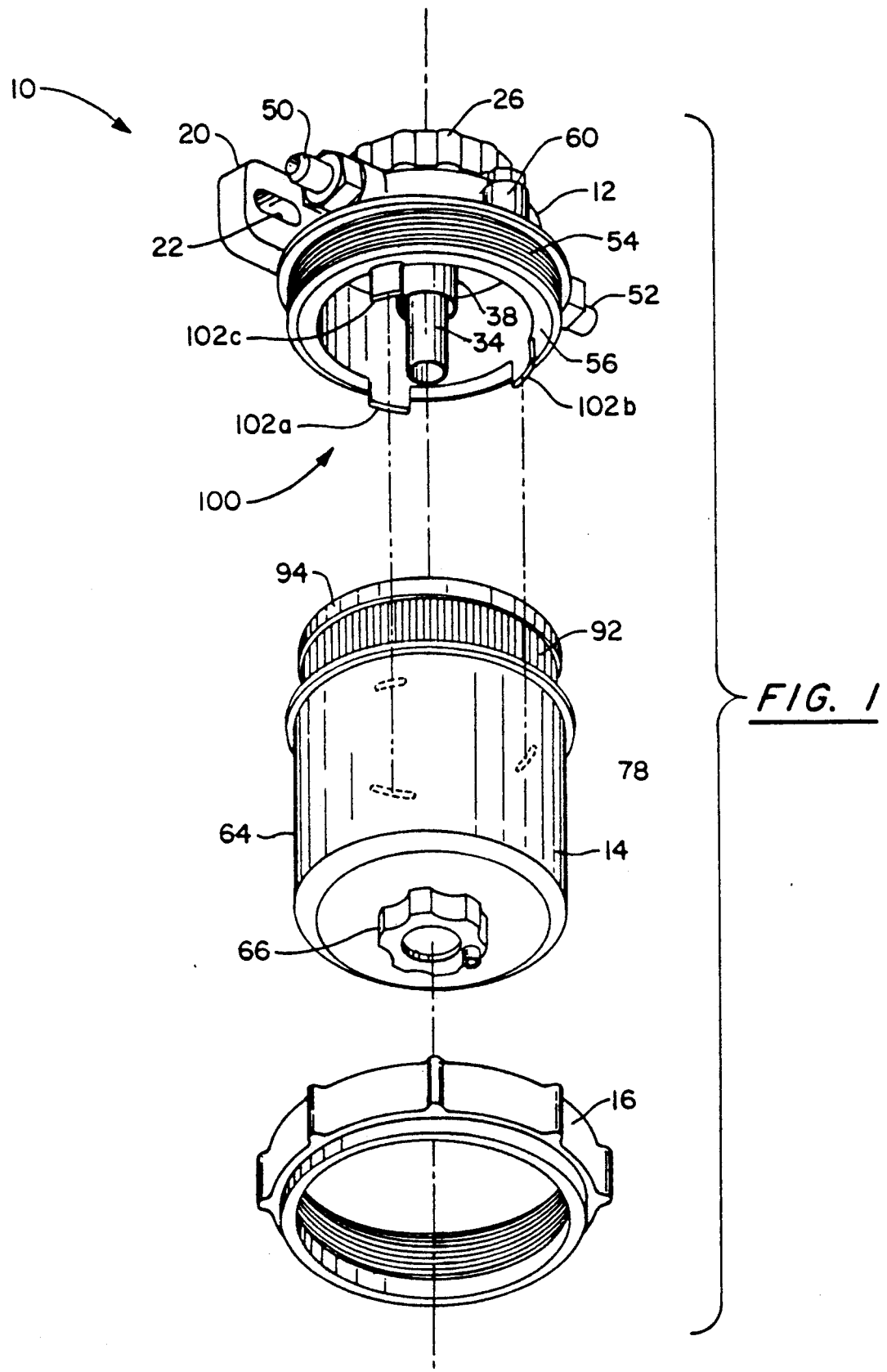
FIG. 1 is an exploded view, partly in phantom, of a filter assembly employing a key system in accordance with the present invention.

With reference to the drawings wherein like numerals represent like parts throughout the several figures, a fuel filter assembly in accordance with the present invention is generally designated by the numeral 10. Fuel filter assembly 10 comprises a base 12 and a disposable filter cartridge 14 which is secured to the base by means of a retaining ring or collar 16. The filter cartridge 14 has a defined useful life and is periodically replaced with a compatible cartridge. The fuel filter assembly is especially adapted for incorporation into the fuel supply system of an internal combustion engine (not illustrated) such as a diesel engine.

The illustrated fuel filter assembly 10 may be similar in form and function to that described in pending U.S. application Ser. No. 404,849 filed on Sep. 8, 1989 which is assigned to the assignee of the present invention. It should, however, be appreciated that the present invention is not limited to any specific fuel filter assembly but is generally applicable to any filter assembly employing a base which mounts and seals with a replaceable filter cartridge of generally cylindrical form.

The illustrated filter assembly has a dual stage filtering system which functions to remove particulate matter from the fuel and to separate water from the fuel. In addition, the fuel filter assembly 10 may include a heater unit for heating the fuel during cold conditions to prevent the precipitation of wax crystals from the fuel.

The base 12 is a cast member which includes an integral cast-formed mounting bracket 20. The bracket contains one or more slots 22 to facilitate mounting the base to the header or other appropriate structure of an internal combustion engine. The base 12 may further include a cavity for receiving a coarse filter screen 24. A head cap 26 threads to the base to secure the screen in position. A sealing ring 28 is also employed to provide a fluid-tight seal between the cap and the base.

The base 12 is an inverted quasi-cup-like member which defines a central stepped axial bore 32. A sleeve 34 having an intermediate integral locating ring 36 is received at one end of the upper reduced portion of base 32. The lower segment of the stepped bore 32 has an enlarged diameter which receives a second sleeve 38. The second sleeve 38 is closely received in concentric relationship with sleeve 34. Sleeve 38 has an intermediate integral locating ring 40 and has a reduced axial length in comparison to that of sleeve 34. The sleeve 38 and its locating ring 40 provide a variable clearance between the base 12 and the cartridge which allows for a tolerance buildup. An annular axial passage 42 is formed between the sleeves 34 and 38. The sleeves 34 and 38 function as axial fluid conduits for the fuel path through the filter assembly.

A fuel inlet passage for the base may include a threaded female connector 50. The fuel inlet passage extends radially and axially through the base. A fuel outlet passage extends radially in general alignment with fuel inlet passage and may include a threaded female connector 52 for connecting with an outlet fuel line. The enlarged annular passage 42 surrounding the inner sleeve 34 leads to the outlet passage.

A threaded surface 54 at the lower peripheral portion of the base 12 is configured for threaded engagement with the retaining collar 16 for securing the disposable filter cartridge 14 to the base 12. A lower circumferential lip 56 of the base includes an annular sealing surface that receives a annular seal 58 which is engaged by an annular sealing surface 57 in the top of the cartridge 14. An air vent 60 may be threaded into the side of the base for venting trapped air therein.

The disposable filter cartridge 14 comprises a can-like container 64 which has an axial opening for receiving a drain-cock 66. Water can be manually drained from the cartridge by rotatably loosening the drain cock 66.

A filter element 70 having a continuous fan-shaped pleated form is received in the container. The filter element 70 extends slightly above the upper side wall of the container. The filter element thus defines an interior central axial chamber 72 and quasi-annular outer chamber 74.

Figure 4:
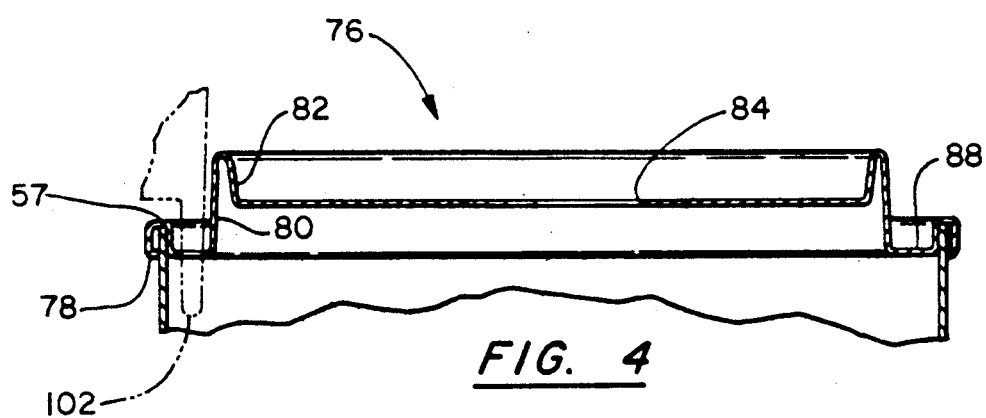
FIG. 4 is an enlarged sectional view of the endcap portion of FIG. 1 with portions of the key system in the installed mode illustrated in phantom.

Multi-folded endcap 76 (best illustrated in FIG. 4) encloses the filter element 70. The endcap 76 is rolled and fastened against the top edge portions of the container to form a circumferential roll seam having an upper retaining shoulder 78. The endcap 76 is also folded so as to have an inner annular retaining shoulder 80 which engages the upper portion of the filter element 70 for locating the element. The endcap 76 also defines at an inner upper location an annular retaining shoulder 82 which is generally coaxial with shoulder 80 and has a smaller diameter than shoulder 80.

Figure 2:
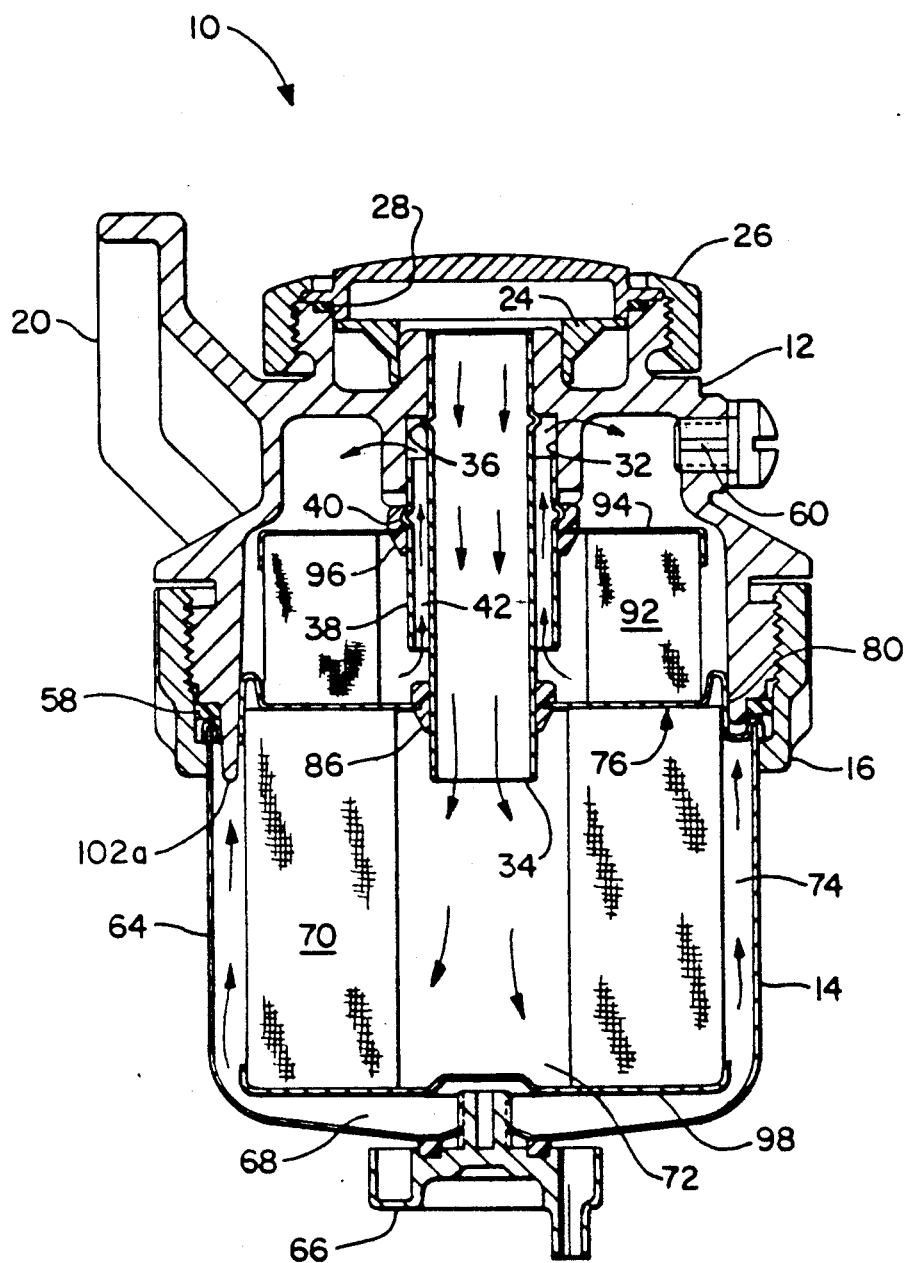
FIG. 2 is a sectional view of the assembled fuel filter assembly of FIG. 1.

A central circular opening 84 through the endcap receives an elastomeric sealing grommet 86 which is dimensioned to fluidly seal against sleeve 34 upon axially mounting the filter cartridge to the base. The axially spaced edge portions of the primary filter element 70 are secured to the underside of the endcap 76 by adhesive such as "Plastisol". A lower annular platform 88 formed by the endcap at the top of the chamber 74 includes a plurality of angularly spaced apertures 90 (best illustrated in FIG. 3). The flow path through the cartridge transverses through the apertures 90 as will be described hereinafter. A second filter element 92 having a continuous fan-shaped, pleated configuration extends from the upper portion of endcap 76. The lower peripheral edges of the filter element 92 retainably abut against shoulder 82 of the endcap 76. A second endcap 94 encloses the axial end of the filter element 92. Endcap 94 includes a peripheral flange which is turned downwardly so as to retainably engage the peripheral edges of the filter element. A central opening through the central portion of the endcap 94 receives an elastomeric sealing grommet 96. Sealing grommet 96 is dimensioned and positioned for fluidly sealing against the outer sleeve 38 when the filter cartridge is mounted to the base. Adhesive such as "Plastisol" adhesive is applied to the end portions of filter element 92 for securing the filter element to endcaps 76 and 94. The fuel enters the fuel filter assembly through the fuel inlet passage and exits the filter through the outlet passage. The general flow path of the fuel through the filter assembly is generally designated by the arrows of FIG. 2. It should be appreciated that for some applications the orientation of the cartridge and the base is essentially inverted and the fuel flow path may thus be directionally inverted in comparison to the path in FIG. 2.

The container of the cartridge portion surrounding the primary filter element is elongated to provide a chamber or sump which is disposed below filter element 70. A lower endcap 98 is also mounted over the lower axial end of the filter element to ensure the flow path transverses through filter element 70. The filter element 70 has water coalescing properties so that the water droplets form at the outlet side of the filter element and fall to the bottom of a sump 68 formed between endcap 98 and container 64. The drain cock 66 is mounted at the bottom of the sump 68 for draining the collected water from the filter. The container 64 may be manufactured from a transparent or translucent material to permit visual inspection of the water level.

A key system designated generally by the numeral 100 is employed to angularly fix the direction of the cartridge 14 relative to the base 12 and to provide a system wherein only a proper replacement cartridge may replace the cartridge once the cartridge is spent. In preferred form, the base is affixed with a plurality of axially projecting keys 102a, 102b, 102c......which project upwardly in integral fashion adjacent the sealing lip 56. The keys 102a, 102b, 102c.....each preferably have a transverse arcuate section contour similar to that of the sealing lip 56.

Figure 3:
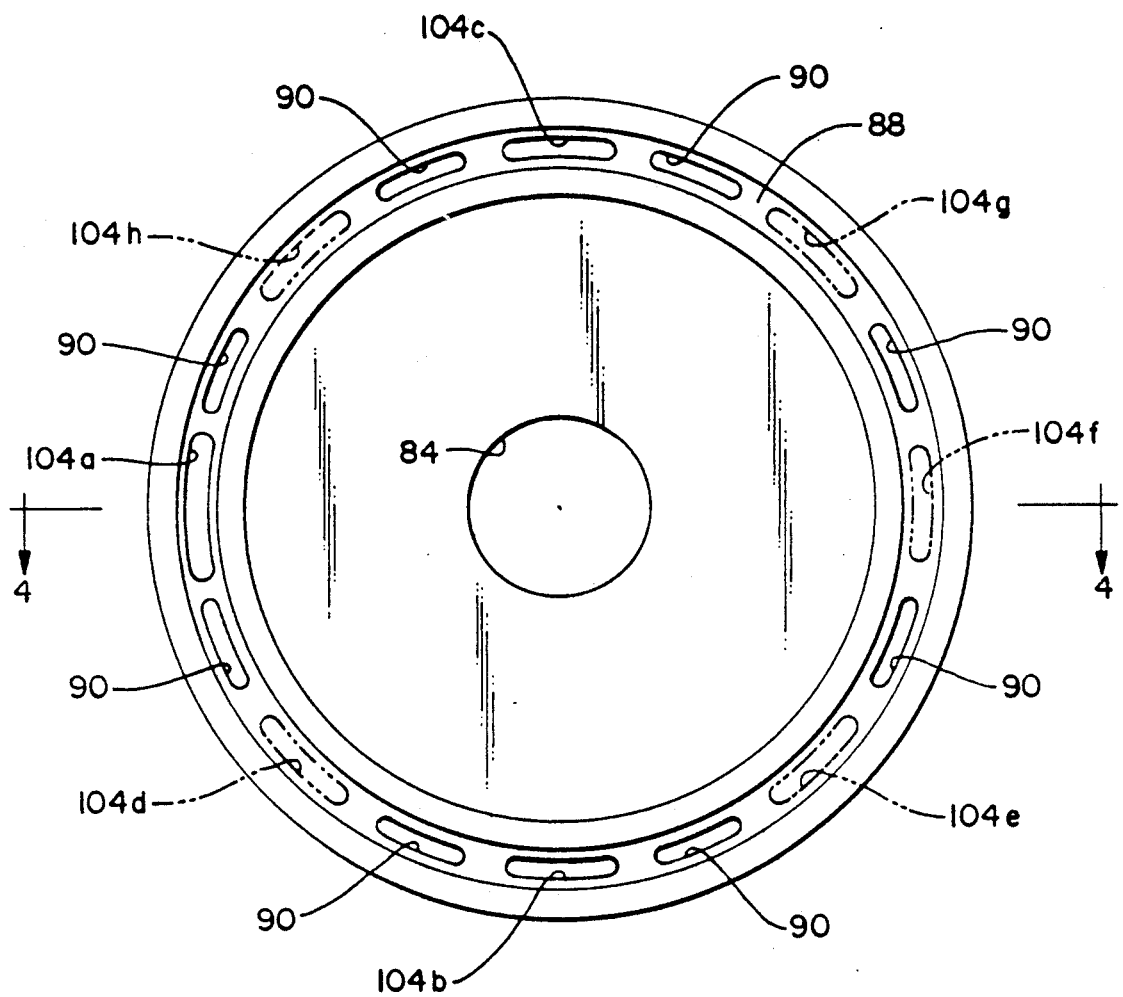
FIG. 3 is an end view, partly in phantom, of a filter cartridge of the filter assembly of FIG. 1.

With additional reference to FIG. 3, corresponding slots 104a, 104b, 104c formed in annular platform 88 of the endcap 76 closely conform to the arcuate sections of the keys and are dimensioned and positioned for close reception of the keys therein. The slots 104a, 104b, 104c....are disposed between apertures 90 of the endcap and are larger than the apertures. With reference to FIG. 1, the cartridge is angularly alignable with the base as defined by the proper alignment of the corresponding keys and slots so that when the cartridge is mounted to the base, the angular orientation of the cartridge relative to the base is fixed and locked in place. The retaining collar 16 is then threadably tightened to base threads 54 to secure and seal the cartridge to the base.

The master key 102a and the corresponding master slot 104a are preferably larger in transverse cross-sectional area than the other corresponding keys. The keys are dimensioned and/or shaped so that they are not insertable or receivable in apertures 90. Alternatively, the master key 102a may have a unique transverse section shape.

With reference to FIG. 3, various permutations in the numbers of keys and their angular location (and those of the corresponding mated slots) can be provided. Possible slots are designated with the designations 104d, 104e, 104f.... Thus, each filter base may be affixed with a unique key matrix which defines a unique corresponding cartridge slot configuration. The unique key/slot combination is required to provide a proper mating and would thereby define a proper replacement cartridge. It will be appreciated that for a given base having a given key combination, the corresponding filter cartridge must have a corresponding slot arrangement in order to provide for a proper mating to allow for the cartridge to be mounted and sealed to the base. Thus, the key system provides a means for ensuring control over cartridge replacement by a proper filter cartridge.

With reference to FIG. 3, excepting for the master slot 104a, there are at least seven possible illustrated slots that can be formed in the endcap at various angular positions between the apertures 90 of the endcap. For the illustrated endcap 76, there are eight equiangularly spaced apertures. It will of course be appreciated that there may be any number of slots and apertures. Accordingly, one or more keys can be cast in the base at corresponding selected angular positions to define a unique key combination corresponding to a filter or dimensioned characteristic for a given base. For example, a corresponding compatible filter cartridge may be selected for a specific filtration rate or capacity, axial length or suitable filter media quality. For example, a two stage filter could be imposed by some key combinations—a single stage filter for other combinations. A filter which separates out water could correspond to some key combinations. For applications which do not require the water separation, a filter base having different key combinations could be employed.

There are additional benefits to the key system. First, the angular orientation of the cartridge 14 is fixed by the master key 102a or other key arrangements. Consequently, any instruction, information or warning labels for the cartridge or filter system can always be oriented in a pre-established fixed orientation upon installation of the filter cartridge. This has the beneficial feature of providing a message or warning which is always visible to the operator or the maintenance personnel. In addition, because the cartridge 14 is fixed at a given angular position, the loosening or tightening of the retainer collar 16 does not cause a corresponding angular displacement of the filter cartridge. In conventional cylindrical filter assemblies, such angular displacement may interfere with loosening the retainer collar or result in damage to the sealing element and/or the cartridge. Any attempts to substitute a non-compatible filter cartridge (without the requisite slot combination) will be reduced because of the necessity of providing a compatible slot arrangement to permit mounting and sealing of the cartridge or physically altering the structure of the base and the filter cartridge.

The location of the keys and the mating key slots may be reversed with respect to the base and the filter cartridge. The keys thus may extend from the endcap 76 of the filter base. Corresponding notches or slots are formed in the base for mating relationship with the keys of the cartridge.

It should also be appreciated that the keys may assume the form of rib-like structures rather than the key structures illustrated in the drawings. In addition, the keys may assume various other forms not illustrated. In order to prevent the accidental or purposeful severing of the keys from the base, the keys may have a greater arcuate section and a smaller axial protrusion than illustrated in the drawings. In one embodiment (not illustrated), eight keys project axially approximately 0.188 inches from the base. The keys each subtend an angle greater than the angular spacing between the keys. The corresponding slots for the keys need not be formed in the endcap as illustrated, but can be located in a number of cartridge locations depending on the specific cartridge configuration which need not comprise a can-like container.

One of the principal features of the invention is that the keys interlock with the corresponding slots while also providing for a high degree sealing integrity between the cartridge element and the base. By positioning the keys and the corresponding slots in close proximity to the cartridge/base sealing interface, any attempt to subvert the keying system by tampering with the base or the cartridge of a non-compatible element is discouraged. Any such tamper would potentially interfere with the fluid seal of the cartridge and the base and thus be easily detected. Modification of an existing cartridge to obtain key compatibility is difficult and unlikely to be cost effective.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

I claim:

1. A fuel filter system comprising:
   base means defining an inlet and an outlet;
   cartridge means mountable to said base means comprising filter means and at least partially defining a flow path communicable with said inlet and outlet for filtering fuel passing through said filter means;
   key means comprising at lest one key axially projecting from said base means; and
   slot means for defining at least one slot in said cartridge means, a said slot being dimensioned and located for axially receiving a corresponding key at a first fixed angular position, said slot means engageable with said key means for locking said cartridge means at said first fixed angular position of said base means.

2. The fuel filter system of claim 1 wherein said base means comprises a sealing lip disposed about a central axis of said base means.

3. The fuel filter system of claim 2 wherein said key means comprises a plurality of keys generally equidistantly spaced from said central axis and located adjacent said sealing lip.

4. The fuel filter system of claim 2 wherein there are a plurality of keys and one of said keys has a transverse section which differs from the corresponding transverse section of the other keys.

5. The fuel filter system of claim 1 wherein said cartridge means further comprises an endcap and said at least one slot is defined in said endcap.

6. The fuel filter system of claim 5 wherein said endcap has a folded configuration comprising an annular sealing surface, and a coaxial recessed surface defining a plurality of angularly spaced apertures, said at least one slot being defined in said recessed surface sealable with said base means between a pair of said apertures.

7. The fuel filter system of claim 6 wherein said annular sealing surface and said coaxial recessed surface are disposed about an axis of said cartridge means and there are a plurality of slots generally equidistantly spaced from said axis.

8. The fuel filter system of claim 1 wherein each said at least one key has a generally arcuate shaped transverse section which subtends a pre-established angle relative to a central axis of the base means.

9. A fuel filter system comprising:
   a cup-shaped base means defining an inlet and an outlet and comprising a sealing lip generally symmetrically disposed about a central axis of said base means and surrounding said inlet and said outlet, said sealing lip including an annular sealing surface located substantially along a plane perpendicular to said axis;
   cartridge means mountable to said base means comprising a generally cylindrical housing means for housing filter means and defining a flow path communicable with said inlet and outlet for filtering fuel passing through said filter means;
   key means comprising a plurality of keys axially integrally projecting from said base means adjacent said sealing lip;
   slot means for defining a plurality of slots in said cartridge means, each said slot being dimensioned and located for receiving a corresponding key for locking said cartridge means at a fixed angular position of said base means; and
   retaining means engageable with said cartridge means and said base means for retaining said cartridge means to said base means.

10. The fuel filter system of claim 9 wherein said keys are disposed in angularly spaced relationship adjacent said sealing lip.

11. The fuel filter system of claim 10 wherein said cartridge means comprises an endcap and said slots are defined in said endcap.

12. The fuel filter system of claim 10 wherein one of said keys has a transverse section which differs from the corresponding transverse section of the other keys.

13. The fuel filter system of claim 9 wherein said cartridge means comprises a generally annular sealing surface parallel to and alignable with the annular sealing surface of said sealing lip and said keys interlock in said slots at locations closely adjacent said sealing surface and said sealing lip.

14. The fuel filter system of claim 9 wherein each said at least one key has a generally arcuate shaped transverse section which subtends a pre-established angle relative to the central axis of the base means.

15. A method for ensuring replacement cartridge compatibility for an array of various types of bases adapted to replaceably axially mount a filter cartridge comprising:
   (a) providing a matrix of axially projecting keys on each base of a given type wherein the bases of each given type have substantially identical key matrices which differ from the key matrices of the other types;
   (b) providing a matrix of sots in each cartridge corresponding to the given type so that for a given compatible cartridge and base, said keys are axially receivable in said slots at a first angular position and interlockable in said slots to lock the cartridge to the base at said first angular position and permit said cartridge to be secureably mounted and sealed with said base, and for each non-compatible cartridge and base, said keys are not interlockable with said slots and interfere with mounting and sealing said non-compatible cartridge to said base.

16. The method of claim 15 further comprising forming a capacity key matrix for each of a plurality of types of cartridge filtering capacity which capacity key matrix differs from the key matrix for other types of cartridge filtering capacity.

17. The method of claim 15 further comprising forming a media quality key matrix for each of a plurality of types of filter media configurations which media quality key matrix differs from the corresponding key matrix for other types of cartridge media quality configurations.

18. The method of claim 15 further comprising forming a dimension key matrix for each of a plurality of types of cartridge dimensions which dimension key matrix differs from the corresponding key matrix for other types of cartridge media configurations.

19. The method of claim 15 comprising integrally providing the matrix of keys on the base.

20. A fuel filter system comprising:
base means defining an inlet and an outlet,;
cartridge means mountable to said base means comprising filter means and at least partially defining a flow path communicable with said inlet and outlet for filtering fuel passing through said filter means;
key means comprising a plurality of keys axially projecting from said base means, wherein one of said keys has a transverse section which differs from the corresponding transverse section of the other keys; and
slot means for defining a plurality of slots in said cartridge means, a said slot being dimensioned and located for receiving a corresponding key for locking said cartridge means at a fixed angular position of said base means.

21. The fuel filter system of claim 20 wherein each said key has a generally arcuate shaped transverse section which subtends a pre-established angle relative to a central axis of the base means.

* * * * *